(12) United States Patent
Morehead

(10) Patent No.: US 7,613,279 B2
(45) Date of Patent: Nov. 3, 2009

(54) METHOD AND SYSTEM FOR DIRECTLY INTERCONNECTING A TDM PBX TO A VOICE MAIL SYSTEM

(75) Inventor: Glen Morehead, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 755 days.

(21) Appl. No.: 11/295,244

(22) Filed: Dec. 6, 2005

(65) Prior Publication Data
US 2007/0127662 A1    Jun. 7, 2007

(51) Int. Cl.
*H04M 1/64* (2006.01)
(52) U.S. Cl. ............ 379/67.1; 379/211.02; 379/221.01; 370/259
(58) Field of Classification Search ................ 379/67.1, 379/211.02, 221.01; 370/259
See application file for complete search history.

(56) References Cited

U.S. PATENT DOCUMENTS

| | | | | |
|---|---|---|---|---|
| 6,389,115 B1 * | 5/2002 | Swistock | ................ | 379/88.12 |
| 6,463,147 B1 * | 10/2002 | Viet | ........................... | 379/219 |
| 6,687,359 B1 * | 2/2004 | D'Arcy et al. | ......... | 379/209.01 |
| 6,937,713 B1 | 8/2005 | Kung et al. | | |
| 6,944,444 B1 | 9/2005 | Gillespie et al. | | |
| 2005/0053219 A1 | 3/2005 | Pearson et al. | | |
| 2005/0063528 A1 | 3/2005 | Pearson et al. | | |
| 2005/0100152 A1 | 5/2005 | Pearson | | |
| 2005/0117731 A1 | 6/2005 | Pearson | | |

* cited by examiner

*Primary Examiner*—Quynh H Nguyen
(74) *Attorney, Agent, or Firm*—Jackson Walker L.L.P.

(57) ABSTRACT

A method is presented for routing a call from a PBX to a voice mailbox on a communication platform wherein a call is received from an originating device at the PBX and the PBX is associated with a voice mail box on a communication platform. A redirecting number associated with the PBX is assigned to an ISDN message set-up string. The call is forwarded to the communication platform along with the ISDN set-up string information. After verification against a subscriber database, the forwarded call, including related ISDN information is delivered to the communication platform voice mail box server for storage and further processing. The redirecting number may represent the voice mail box identifier, and for increased security and privacy, the voice mail box may be different from the number for the PBX extension from which the voice and data messages are received.

9 Claims, 3 Drawing Sheets

METHOD AND SYSTEM FOR DIRECTLY INTERCONNECTING A TDM PBX TO A VOICE MAIL SYSTEM

FIELD OF THE INVENTION

The present invention relates in general to the field of call forwarding for voice mail systems.

DESCRIPTION OF THE RELATED ART

Call forwarding has been used to route calls from an unused, engaged or unattended telephone device to a voice mail system where the user expects messages will be archived for later retrieval. Voice mail systems are used to handle calls and caller responses where the user is busy or is unable to answer. While such systems are useful, service providers and subscribers to voice mail services may desire increased efficiencies for call forwarding based on associated data messages.

Accordingly, there is a need for an improved system and method relating to handling forwarded calls associated with voice mail systems.

BRIEF DESCRIPTION OF THE FIGURES

For detailed understanding of the present disclosure, references should be made to the following detailed description of an exemplary embodiment, taken in conjunction with the accompanying drawings, in which like elements have been given like numerals.

DETAILED DESCRIPTION

Figure 1:
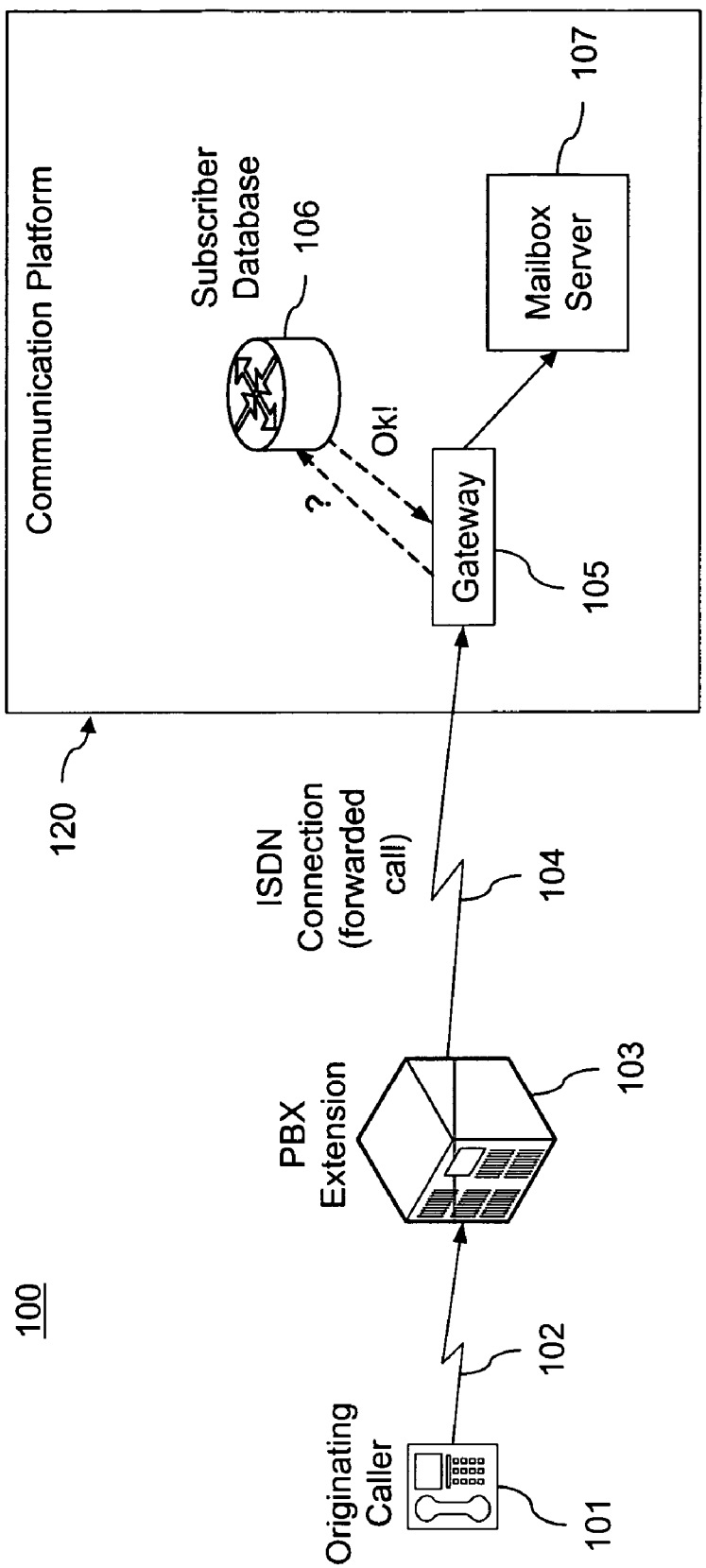
FIG. 1 illustrates a system providing a PBX connected to Communication Platform with an ISDN connection.

The present disclosure is generally directed to a method and system to direct calls to a voice mailbox on a communication platform. One or more various aspects and/or embodiments are presented to provide for connecting a Time-Division Multiplexing (TDM) Private Branch Exchange (PBX) telephone system to a communications platform via a dedicated or switched Integrated Solutions Digital Network (ISDN) connection. In a particular embodiment, the method includes receiving a call from an originating device at a PBX extension and forwarding the call to a communications platform. The forwarded call has an associated ISDN message set-up string that includes a redirecting number. The redirecting number associated with the forwarded call is the voice mail box number on the communication platform.

A PBX system is a private telephone network used within an enterprise. A PBX extension may be associated with individual users or a user's phone. Users of the PBX system share a number of outside lines for making telephone calls external to the PBX. Medium-sized and larger companies may use a PBX because it can be less expensive than connecting an external telephone line to every telephone in the organization.

Communication platforms may have many capabilities, including recording and storing voice mail, emails and fax messages, and forwarding any or all of these messages to another location via an outbound message. A communication platform may also transfer an inbound call on a real-time basis to (for example) an attendant for personal handling.

These outbound call capabilities may place significant constraints on the communication platform. Specifically, the platform must be able to differentiate between the telephone numbers of the originating caller, the original called number, and the access number of the Communication platform itself, and either denies or accepts and routes the call accordingly. The specific designation for the original called number in this context may be the Redirecting Number. The Redirecting Number is also known as Information Element 74 (IE 74) in the ISDN message set-up string.

Communication platforms may take many forms including distributed communications platform systems where some or all equipment and functionality may be distributed between a customer's or subscriber's local site and a service provider's Central Office (CO) or other facilities that may be remote from customer premises equipment. For example, a true "Centrex" system is a PBX like service providing switching and related communication functions at the central office instead of at the customer's premises. A service provider or telephone company owns and manages all the communications equipment and software necessary to implement the Centrex service and provides various services to the customer.

However, in a true Centrex system, no switching equipment resides on the customer premises as the service is supplied and managed directly from the service provider's exchange sites, with communication channels delivered to the premises either as individual lines, or delivering many lines multiplexed to the premises over fiber optic or copper links, eliminating the need to bring many individual pairs from the exchange to the customer premises. True Centrex systems provide an emulation of a localized hardware PBX system by using special software programming at the service provider's CO, which can be customized to meet a particular customer's needs.

The location of PBX extensions that are associated with an individual phone may reside on a customer's site and may also be associated with a service provider's CO. When the PBX extension resides at a customer's site, the PBX extension may be connected to a service provider's communication platform over an ISDN line.

In one non-limiting aspect, an embodiment is presented that enables a communication platform to use the Redirecting Number to automatically identify a client or service subscriber's mailbox number. A common default configuration implemented by TDM PBX manufacturers disables or ignores Redirecting Numbers in PBX operating systems. As such, in their default configurations, today's PBXs may not integrate optimally or fully with a communication platform. In this context, an optimal or full integration refers to the capability of a communication platform to recognize a call forwarded from a PBX extension that is coming into the subscriber's mailbox to 1) route the forwarded call to the voice mail box automatically, 2) automatically play the subscriber's greeting to a transferred caller, and 3) recognize when the subscriber is calling from his own telephone to access the platform, bypass requiring him to enter identification information, and if necessary prompt him to enter his security code.

A method is disclosed that allows any PBX capable of ISDN connectivity to fully integrate with a communications platform via a dedicated or switched connection. For normal telephone use, most PBXs connect to the Public Switched Telephone Network (PSTN) via one or more trunks. ISDN is a common method of connecting, as it allows for passing caller ID digits to the PBX. An ISDN connection may be made up of several dedicated voice channels and a dedicated data channel. The data channel is used to pass call setup and teardown messages (e.g., message setup strings) between the PBX and a CO. The data messages are called Information Elements, or IEs, and are standardized in their format and content. A current standard for ISDN is called the National ISDN Specification 2, or NI-2. TDM PBX systems generally comply with at least part, but often not all, of NI-2. There are several IEs within the Specification that are considered optional, and whether all IEs are enabled (as well as the specific use) may be at the manufacturer's discretion.

In one embodiment, a method is presented for routing a call from a PBX to a voice mailbox on a communication platform wherein a call is received from an originating device at the PBX and the PBX is associated with a voice mail box on a communication platform. A redirecting number associated with the PBX is assigned to an ISDN message set-up string. The call is forwarded to the communication platform along with the ISDN set-up string information. After verification against a subscriber database, the forwarded call, including any related ISDN information is delivered to the communication platform voice mail box server for storage and further processing. The redirecting number may represent the voice mail box identifier, and for increased security and privacy, the voice mail box may be different from the number for the PBX extension from which the voice and data messages are received. The communication link between the PBX, which may be a 'local' implementation and the communications platform, which may be remote (e.g., a service provider's CO), may be a dedicated ISDN line or it may go over the public switched telephone network. The assigned redirecting number may be the mail box identification number associated with the PBX on the communication platform. Other values associated with a forwarded call that may be assigned as ISDN set-up string values that may be used for subsequent voice mail responses and operations includes a calling party number, a calling party subaddress, a called party number, a called party subaddress, a no user responding indicator and user busy indicator.

In another aspect, a system is provided for routing a message to a voice mail box on a communication platform that includes a PBX extension that assigns mail box addresses to a redirecting number field in an ISDN set-up string with the PBX connected to the communication platform with an ISDN connection. The ISDN may be dedicated connection. The communication platform includes a mail box server, a subscriber database that has addresses associated with the PBX and the communication platform, and a gateway for obtaining data ISDN message set-up strings associated with forwarded voice mail messages. The system may have a processor with instructions for assigning a redirecting number on the PBX that is the voice mail box identifier on the communication platform. The assigned redirecting number on the PBX does not have to be the PBX extension number, and affords more security and privacy if the voice mail box identifier value is not the PBX extension number. The gateway may be used for verifying the redirecting number against a subscriber database. Other values that may be assigned to the ISDN set-up string include a calling party number, a calling party subaddress, a called party number, a called party subaddress, a no user responding indicator and user busy indicator.

Another embodiment provides for a set of application program interfaces embodied on a computer readable medium for execution on a PBX in conjunction with an application program that forwards a call to a voice mail box on a communication platform. A first interface receives an input from an originating caller and determines whether to forward a call to the communication platform. A second interface receives an input for assigning a redirecting number to an ISDN message set-up string where the ISDN message set-up string is associated with the call A third interface receives an input for forwarding the call to the communication platform over an ISDN connection, which may be a dedicated or switched connection, linking the PBX and the communications platform. These application program interfaces may further comprise a mail box identifier associated with the PBX on the communication platform. The mail box identifier may be a value different from the PBX extension number to provide increased security and privacy. Other values may also be assigned to the ISDN set-up string associated with a forwarded message and include a calling party number, a calling party subaddress, a called party number, a called party subaddress, a no user responding indicator and user busy indicator.

In still another embodiment, a set of application program interfaces is embodied on a computer readable medium for execution on a communication platform, which may reside at service provider's CO, in conjunction with an application program that receives a call forwarded from a PBX, which may be local to a subscriber's premises, to a voice mail box on the communication platform. A first interface receives an input from the PBX and determines the PBX has an associated voice mail box. A second interface receives an input from an ISDN set-up string. A third interface receives an input for maintaining an ISDN connection to the PBX. The connection linking the PBX to the communication may be a dedicated connection.

Turning now to FIG. 1, an illustrative embodiment of a system 100 is shown in which a call flow for connecting a TDM PBX to a Communications Platform 120 is presented. The representative originating caller 101 places a call to a representative subscriber's extension on a PBX 103 via a telephone connection 102. This connection 102 can be any type, and external or internal to the PBX. If the subscriber does not answer the call or is already on another call, the PBX 103 forwards, or redirects, the call via an ISDN connection 104 to the gateway 105 associated with the Communication platform. When the PBX 103 redirects the call, the associated message set-up string includes the telephone number of the originating caller 101 and the telephone number of the extension 103 that redirected the call. Additionally, the set-up string may include the reason for the call's redirection (busy, non-responsive, etc.). The reason for the call's redirection may be used by the communication platform to use various message responses to caller's before they leave a message. The telephone number of the extension 103 may be included in the ISDN Call Setup String as Information Element 74 (IE-74). Alternatively, a number associated with the redirecting device (the PBX), which may be the number that is the voice mail box number/identifier on the communication platform, is assigned to IE-74. Also, it should be noted that while IE-74 is being used in this 20 disclosure as an example in the embodiments discussed herein, any other ISDN set-up string field may be used for the data being sent associated with the mail box identifier. There is no requirement that limits the redirecting number to IE-74, just as there is no requirement that the redirecting number is limited the phone number or extension number of the PBX itself.

The ISDN connection 104 may be via either the public telephone network or a dedicated circuit between the PBX 103 and the gateway 105. When the call arrives at the Gateway 105, the Gateway 105 parses, or disassembles, the ISDN Call Setup String and extracts both Information Element 74 and the telephone number of the originating caller 101. The gateway 105 then queries the subscriber database 106 to verify that the extension number contained in Information Element 74 is a valid subscriber number on the Communication Platform. Upon receiving validation from the subscriber database 106, the gateway 105 transfers the call inside the Communication Platform to the mailbox server 107 for that particular subscriber. The mailbox server 107 uses the data contained in Information Element 74 to direct the call directly to the subscriber's mailbox, then retrieves and plays the subscriber's greeting for the origination caller 101 and records any message.

In a particular embodiment, the method or system includes: i) an ISDN connection from a customer's PBX extension to a Communication platform; ii) activation of the IE-74 data message field within the TDM PBX; and optionally iii) access (through a subscription or other connectivity) to a communication platform service.

Figure 2:
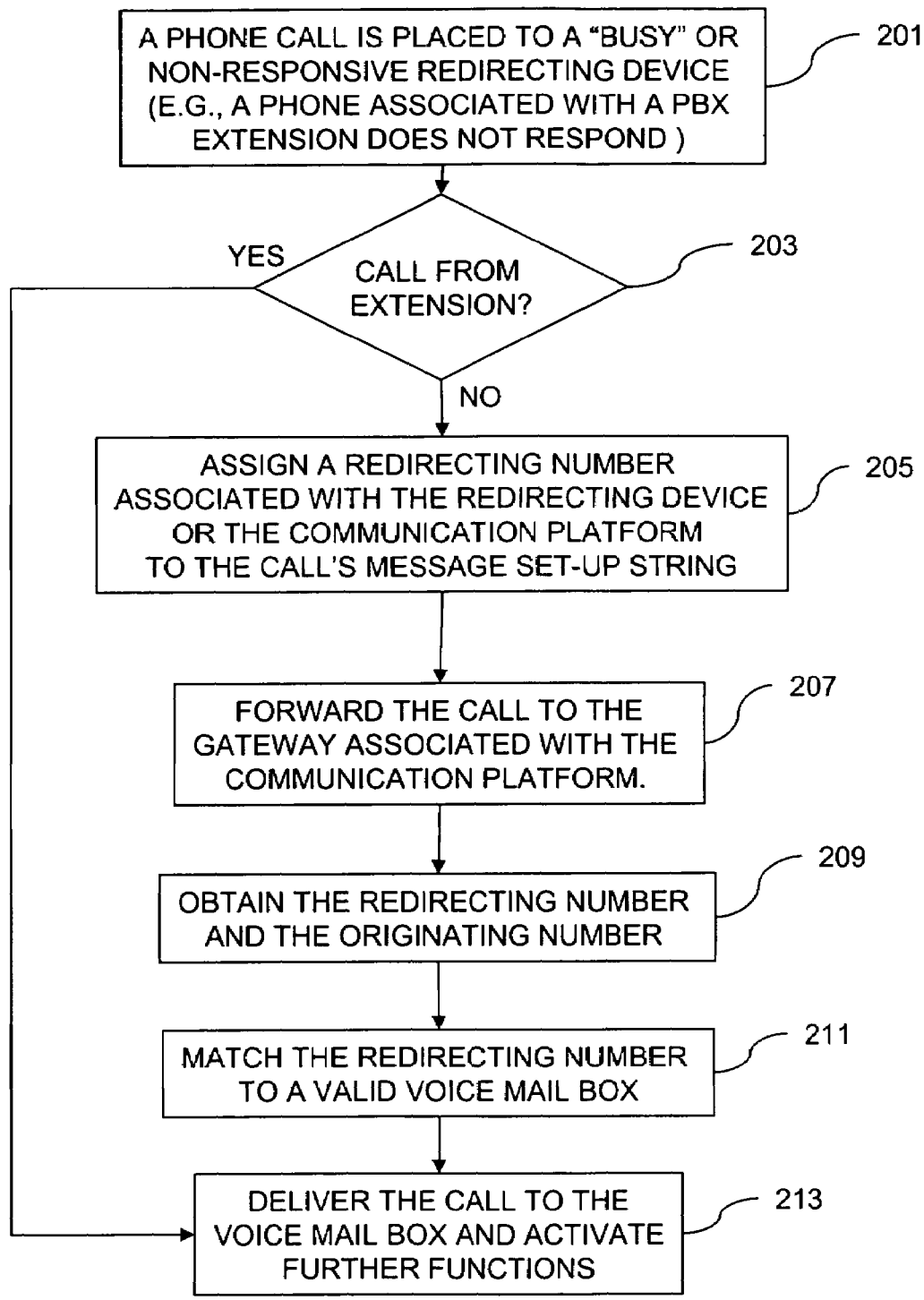
FIG. 2 illustrates a flow chart of a method for forwarding voice and data information between a PBX and a communication platform.

Referring to FIG. 2, an embodiment routing a call to a voice mail box on a communications platform is presented. A call is received at a busy or non-responsive redirecting device (e.g., a phone associated with a PBX) 201. A determination is made whether or not the call is from an extension associated with the PBX 203. For example if the call is from a subscriber's extension on the PBX there may be no redirecting number assigned to IE-74, and the call will be forwarded directly to the voice mail box on the communication platform for further actions. If a determination is made that the call is external, a redirecting number associated with the PBX or the communication platform voice mail box is assigned 205 to the call's message set-up string. Other message set-up string data that may be associated with the call include original calling number and the reason for forwarding the call. The call is forwarded 207 to a gateway associated with the communication platform. The gateway extracts the data in the message set-up string 209 including the redirecting number and the call's originating number. If the data in IE-74 matches 211 the voice mail box on the communication platform, the call is delivered to the voice mail box and any further functions are activated.

Figure 3:
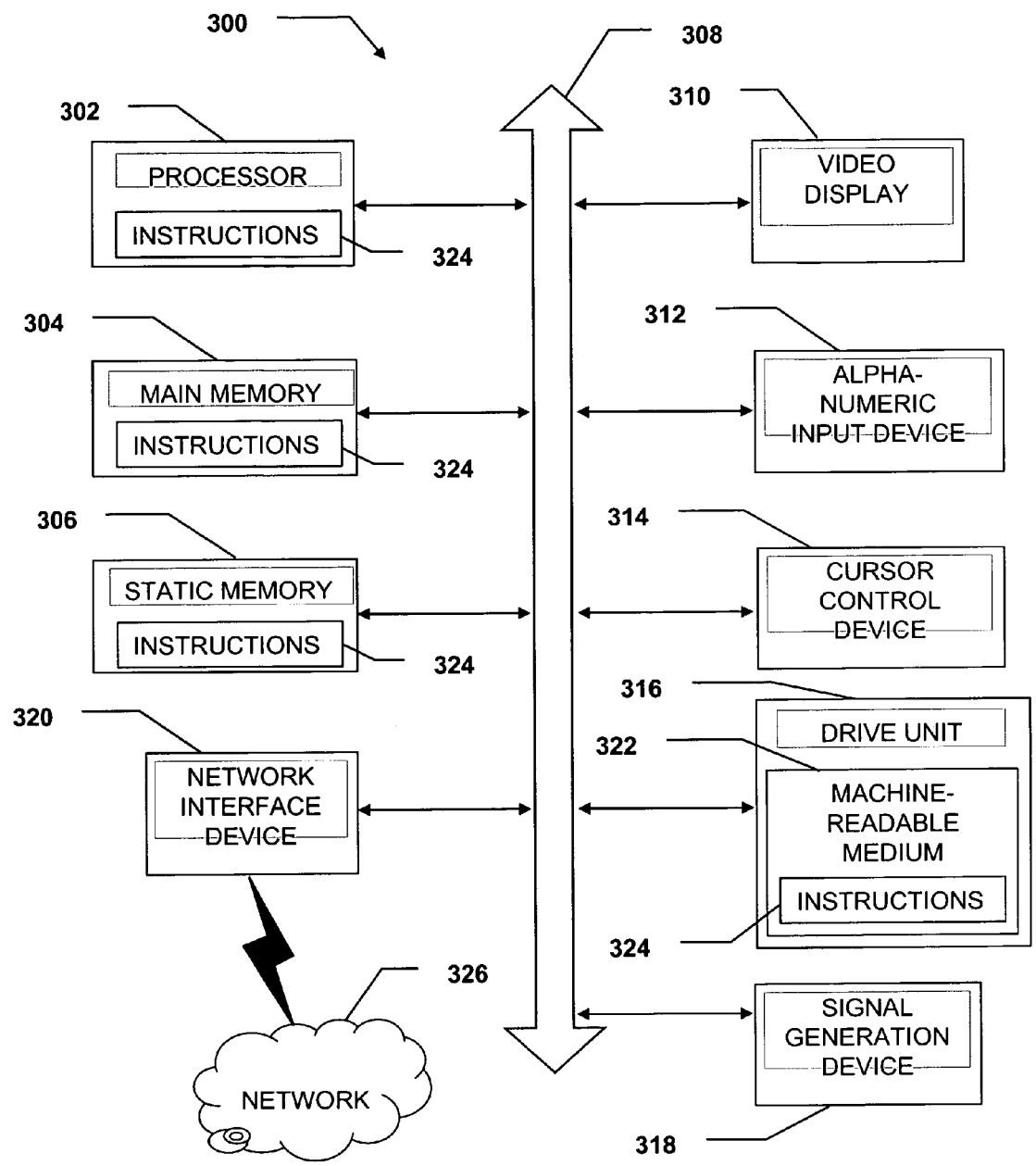
FIG. 3 is a diagrammatic representation of a machine in the form of a computer system within which a set of instructions, when executed, may cause the machine to perform any one or more of the methodologies of embodiments herein.

FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated in herein above. These instructions 324 may comprise a routine or set of instructions for a computer program. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present disclosure describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, this disclosure and the drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of routing a call from a Private Branch Exchange (PBX) to a voice mailbox on a communication platform, the method comprising:
   receiving a call from an originating device at the PBX, wherein the PBX is associated with a voice mail box on a communication platform;
   linking the PBX to the communication platform with an ISDN connection, wherein the ISDN connection comprises a dedicated ISDN connection and/or a switched ISDN connection;
   assigning a redirecting number associated with the PBX to an ISDN message set-up string of the call;
   forwarding the call to the communication platform;
   delivering the forwarded call to a destination voice mailbox based on the redirecting number; and
   assigning a value at the PBX to the ISDN call message set-up string selected from the list consisting of: i) a calling party number; ii) a calling party subaddress; iii) a called party number; iv) a called party subaddress; v) no user responding, and vi) user busy.

2. The method of claim 1 wherein the assigned redirecting number is the mail box identification number associated with the PBX on the communication platform.

3. The method of claim 1 wherein the assigned redirecting number is not the PBX extension number for the PBX that assigns the redirecting number.

4. The method of claim 1 wherein delivering the forwarded call to a destination voice mailbox further comprises checking the redirecting number against a subscriber database.

5. A system for routing a message to a voice mail box on a communication platform comprising:
   a Private Branch Exchange (PBX) including an extension that assigns mail box addresses to a redirecting number field in an ISDN message set-up string of a call, the PBX connected to the communication platform with an ISDN connection, wherein the connection from the PBX to the communication platform is a dedicated ISDN connection and/or a switched ISDN connection;
   a communication platform mail box server;
   a subscriber database on the communication platform comprising a mail box address associated with the communication platform mail box server;
   a gateway on the communication platform for obtaining data from the message set-up string; and
   wherein the PBX is configured for assigning a value to the ISDN call message set-up string selected from the list consisting of: i) a calling party number; ii) a calling party subaddress; iii) a called party number; iv) a called party subaddress; v) no user responding, and vi) user busy.

6. The system of claim 5 comprising a processor with instructions for assigning a redirecting number on the PBX that is the voice mail box identifier on the communication platform.

7. The system of claim 5 further comprising a processor with instructions for assigning a redirecting number on the PBX that is not the PBX extension number.

8. The system of claim 5 wherein further comprising a gateway for verifying the redirecting number against a subscriber database.

9. A tangible computer readable medium comprising embedded instructions for execution on a Private Branch Exchange (PBX) in conjunction with an application program that forwards a call to a voice mail box on a communication platform, comprising:

(a) a first interface that receives an input from an originating caller and determines whether to forward a call to the communication platform;

(b) a second interface that receives an input for assigning a redirecting number to an ISDN message set-up string, the ISDN message set-up string associated with the call; wherein the input received by the second interface further comprises a mail box identifier associated with the PBX on the communication platform, and wherein the mail box identifier is not the PBX extension number; and (c) a third interface that receives an input for forwarding the call to the communication platform over an ISDN connection linking the PBX and the communications platform; and (d) receive an input for assigning a value to the ISDN message set-up string, the value selected from the list consisting of: i) a calling party number; ii) a calling party subaddress; iii) a called party number; iv) a called party subaddress; v) no user responding, and vi) user busy; and wherein the voice mail box associated with the PBX is linked by a dedicated ISDN connection to the communication platform and/or by a switched ISDN connection to the communication platform.

* * * * *

UNITED STATES PATENT AND TRADEMARK OFFICE
CERTIFICATE OF CORRECTION

PATENT NO. : 7,613,279 B2  Page 1 of 1
APPLICATION NO. : 11/295244
DATED : November 3, 2009
INVENTOR(S) : Glen Morehead It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Nineteenth Day of October, 2010

David J. Kappos
*Director of the United States Patent and Trademark Office*